(12) United States Patent
Murrish et al.

(10) Patent No.: US 11,549,549 B2
(45) Date of Patent: Jan. 10, 2023

(54) ENGINE CRANKSHAFT ASSEMBLIES WITH INTERNAL STIFFENING STRUCTURES

(71) Applicant: GM GLOBAL TECHNOLOGY OPERATIONS LLC, Detroit, MI (US)

(72) Inventors: Dale E. Murrish, Troy, MI (US); Scott A. Hucker, Ortonville, MI (US); Maurice G. Meyer, Jefferson City, TN (US)

(73) Assignee: GM Global Technology Operations LLC, Detroit, MI (US)

( * ) Notice: Subject to any disclaimer, the term of this patent is extended or adjusted under 35 U.S.C. 154(b) by 14 days.

(21) Appl. No.: 17/304,120

(22) Filed: Jun. 15, 2021

(65) Prior Publication Data
US 2022/0397149 A1 Dec. 15, 2022

(51) Int. Cl.
*F16C 3/06* (2006.01)
*F16C 3/08* (2006.01)

(52) U.S. Cl.
CPC ............ *F16C 3/08* (2013.01); *F16C 2204/20* (2013.01); *F16C 2204/60* (2013.01); *F16C 2360/22* (2013.01)

(58) Field of Classification Search
CPC .......... F16C 3/06; F16C 3/08; F16C 2204/20; F16C 2204/60; F16C 2360/22
See application file for complete search history.

(56) References Cited

U.S. PATENT DOCUMENTS

| | | | | |
|---|---|---|---|---|
| 1,494,106 A | * | 5/1924 | Elliott | F16C 3/06 74/603 |
| 2,557,559 A | * | 6/1951 | Parducci | F16C 3/08 184/6.24 |
| 5,134,900 A | * | 8/1992 | Swars | F16C 3/18 74/595 |
| 5,327,813 A | * | 7/1994 | DeBell | F16J 1/16 123/193.6 |
| 8,533,946 B2 | | 9/2013 | Murrish et al. | |
| 8,967,112 B2 | | 3/2015 | Murrish et al. | |
| 9,186,720 B2 | | 11/2015 | Murrish et al. | |

(Continued)

FOREIGN PATENT DOCUMENTS

DE  102017127514 A1 * 5/2018 ............. F01L 1/047
FR  1425669 A * 1/1966

*Primary Examiner* — Adam D Rogers
(74) *Attorney, Agent, or Firm* — Quinn IP Law

(57) ABSTRACT

Presented are crankshaft assemblies with internal stiffening structures, methods for making/using such crankshaft assemblies, and internal combustion engines equipped with such crankshaft assemblies. A crankshaft body, which is formed with a first material, includes multiple bearing journals that are mutually coaxial to rotate on a crankshaft axis and spaced from each other along the length of the crankshaft. Each bearing journal has an internal journal cavity. Multiple crankpins are longitudinally spaced from each and axially offset from the crankshaft's rotational axis. Each crankpin has an internal crankpin cavity. Multiple crank webs project radially from the crankshaft axis and interconnect the bearing journals with the crankpins. Each crank web has an internal web cavity. Disposed within the journal cavities, crankpin cavities, and/or web cavities is a stiffening bar formed with a second material having a modulus of elasticity that is greater than the modulus of elasticity of the first material.

20 Claims, 3 Drawing Sheets

(56) References Cited

U.S. PATENT DOCUMENTS

| | | | |
|---|---|---|---|
| 9,970,476 | B2 | 5/2018 | Murrish et al. |
| 10,190,450 | B2 | 1/2019 | Balding |
| 10,458,290 | B2 | 10/2019 | Balding |
| 2007/0277645 | A1* | 12/2007 | Weisskopf ......... B22D 19/0072 74/579 E |
| 2016/0069382 | A1* | 3/2016 | Chottiner ................ B23P 13/00 74/603 |
| 2016/0084295 | A1 | 3/2016 | Murrish et al. |
| 2017/0089423 | A1 | 3/2017 | Hucker et al. |
| 2017/0114898 | A1* | 4/2017 | Hayman ............... F04B 53/147 |
| 2017/0241471 | A1 | 8/2017 | Murrish et al. |
| 2019/0323390 | A1 | 10/2019 | Balding et al. |

* cited by examiner

ENGINE CRANKSHAFT ASSEMBLIES WITH INTERNAL STIFFENING STRUCTURES

INTRODUCTION

The present disclosure relates generally to torque transmitting shafts. More specifically, aspects of this disclosure relate to crankshaft assemblies for internal combustion engines.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include spark-ignited (SI) gasoline engines, compression-ignited (CI) diesel engines, two, four, and six-stroke architectures, and rotary engines, as some non-limiting examples. Hybrid electric vehicles (HEV) and full electric vehicles (FEV), on the other hand, use alternative power sources to propel the vehicle, such as battery-powered or fuel cell-powered electric traction motors. In so doing, HEVs and FEVs are able to minimize or eliminate reliance on a fossil-fuel based engine for tractive power.

A common "overhead valve" internal combustion engine includes an engine block with a succession of internal cylinder bores, each of which has a piston reciprocally movable therein. Coupled to a top surface of the engine block is a cylinder head that cooperates with the piston and cylinder bore to form a combustion chamber. These reciprocating pistons are used to convert pressure—generated by igniting a fuel-and-air mixture inside the combustion chamber—into rotational forces to drive an engine crankshaft. The cylinder head defines intake ports through which air, provided by an intake manifold, is selectively introduced into each combustion chamber. Also defined in the cylinder head are exhaust ports through which exhaust gases and byproducts of combustion are selectively evacuated from the combustion chambers to an exhaust manifold. The exhaust manifold, in turn, collects and combines the exhaust gases for metered recirculation into the intake manifold, delivery to a turbine-driven turbocharger, or evacuation from the vehicle via an exhaust system. The Exhaust system has catalysts for reducing harmful pollutants, like carbon monoxide, unburned hydrocarbons, nitrogen oxides and soot (e.g., in diesel engines).

Four-stroke combustion engines commonly operate—as the name suggests—in four distinct stages or "strokes" to drive the engine's crankshaft. At one such (first) stage of operation, referred to as the "intake stroke," a metered mixture of fuel and air is introduced into each cylinder as the corresponding piston travels rectilinearly from top-to-bottom along the length of the cylinder bore. Engine intake valves are opened such that a vacuum pressure generated by the downward-travelling piston draws air into the combustion chamber. At the end of this cycle, a metered quantity of finely atomized fuel is introduced into the chamber via a fuel injector. During a subsequent (second) stage, referred to as the "compression stroke," the intake and exhaust valves are closed as the piston travels from bottom-to-top and concomitantly compresses the fuel-air mixture. Upon completion of the compression stroke, another (third) stage or "power stroke" commences and a spark plug ignites the compressed fuel and air, with the resultant explosive expansion of gases pushing the piston back to bottom dead center (BDC). During a successive stage—more commonly referred to as the "exhaust stroke"—the piston once again returns to top dead center (TDC) with the exhaust valves open; the travelling piston expels the spent air-fuel mixture from the combustion chamber. To complete the four strokes of a single working (Otto) cycle entails two revolutions of the crankshaft.

An engine's crankshaft converts reciprocating linear movement of the engine pistons into rotational movement that is output as drive torque to propel the vehicle. Unlike conventional torque-transmitting shafts, which are fabricated as right-circular cylinders, the engine crankshaft is a non-linear structure with coaxial bearing journals interconnected with a series of axially offset crankpins to which the reciprocating pistons are attached via connecting rods. These axially aligned bearing journals are spaced along the length of the crankshaft and ride on bearing bushings held in the engine crankcase. Radially projecting crank webs couple the bearing journals to the crankpins; optional counterweights integral with the webs help to balance internal forces or reduce loads on the main bearing journals. To reduce crankshaft mass, a hollow core may be formed into and extend through each of the crankpins and bearing journals. Any reduction in mass, however, is necessarily balanced with undesirable noise, vibration and harshness (NVH) and the crankshaft's ability to withstand the stresses accompanying engine operation.

SUMMARY

Presented herein are crankshaft assemblies with internal stiffening structures, methods for making and methods for using such crankshaft assemblies, internal combustion engines equipped with such crankshaft assemblies, and motor vehicles equipped with such engines. In a non-limiting example, an engine crankshaft assembly includes an internal stiffening structure that is packaged inside one or more of the crankshaft's crankpins and bearing journals. The crankshaft may be cast and machined from a lower-modulus material, such as nodular (ductile) iron, whereas the internal stiffening structure may be fabricated from a higher-modulus material, such as steel or ceramic. The stiffening structure may take on the form of an elongated I-beam that may be twisted axially and bent transversely into a sinusoidal or helical shape and threaded through hollow cores or geometrically complementary through-holes in the bearing journals, webs, and crankpins. Alternatively, one or more individual I-beam segments may be packaged within each crankpin/journal/web. Intermediate space between the internal stiffening structure and an inner-diameter (ID) surface of the optional hollow cores of the crankpin/journal/web may be packed with nylon, plastic, rubber, aluminum, tin or wood. To simplify manufacture and assembly, the internal stiffening structure may be cast or forged inside cavities within the crankshaft. Attendant benefits for at least some of the disclosed concepts include crankshaft assemblies with internal stiffening structures that increase elastic modulus, reduce noise and vibration, and decrease material costs.

Aspects of this disclosure are directed to internally stiffened crankshaft assemblies for torque-generating devices, such as ICE assemblies, pressure-generating devices, such as compressors and pumps, and other vehicular and non-vehicular applications. By way of example, a representative crankshaft assembly includes a crankshaft body that is formed, in whole or in part, from a rigid (first) material. The crankshaft assembly includes multiple bearing journals, multiple crankpins, and multiple crank webs. The bearing journals are mutually coaxial to rotate on a crankshaft axis and are spaced from each other along the length of the crankshaft body. The crankpins are also spaced from each other along the length of the crankshaft body; however, the crankpins are axially offset from the crankshaft axis. The crank webs project radially from the crankshaft axis and interconnect the bearing journals with the crankpins. Each journal bearing, crankpin, and crank web defines therein a respective cavity. One or more stiffening bars are disposed within one or more or all of the journal, crankpin, and/or web cavities. Each stiffening bar is formed, in whole or in part, from another rigid (second) material that has a modulus of elasticity that is greater than the modulus of elasticity of the first material.

Additional aspects of this disclosure are directed to motor vehicles equipped with internal combustion engines having crankshaft assemblies with internal stiffening structures. As used herein, the terms "vehicle" and "motor vehicle" may be used interchangeably and synonymously to include any relevant vehicle platform, including but not limited to passenger vehicles (ICE, REV, FCH, fully and partially autonomous, etc.), commercial vehicles, industrial vehicles, tracked vehicles, off-road and all-terrain vehicles (ATV), motorcycles, farm and construction equipment, watercraft, aircraft, etc. In an example, a motor vehicle includes a vehicle body with a passenger compartment, multiple road wheels rotatably mounted to the vehicle body (e.g., via a unibody chassis or body-on-frame chassis), and other standard original equipment. An engine assembly is also mounted to the vehicle body and operates alone (e.g., for ICE powertrains) or in conjunction with one or more electric traction motors (e.g., for hybrid electric powertrains) to selectively drive one or more of the road wheels to thereby propel the vehicle.

Continuing with the discussion of the above example, the engine assembly includes an engine block with a series of internal cylinder bores, a piston reciprocally movable within each cylinder bore, and a crankshaft assembly, e.g., located in a crankcase of the engine block. The crankshaft assembly includes a single-piece crankshaft body that is formed, in whole or in part, from a rigid (first) material. The crankshaft body includes two or more bearing journals that are rotatably attached to the engine block, mutually coaxial to rotate on the crankshaft's center axis, and spaced from each other along a length of the crankshaft body. Each bearing journal defines therethrough a journal cavity. A series of crankpins are coupled to pistons, spaced from each other along the length of the crankshaft body, and axially offset from the crankshaft center axis to orbit about the crankshaft axis. Each crankpin defines therethrough a crankpin cavity. Crank webs project radially from the crankshaft axis and connect the bearing journals with the crankpins. Each crank web defines therethrough a web cavity. A stiffener with an elongated, non-linear beam body may be bent transversely (i.e., curved about a lateral axis) and rotated circumferentially (e.g., torqued about a longitudinal axis) with respect to a stiffener center axis such that the stiffener is threaded through the journal cavities, crankpin cavities, and web cavities. The stiffener is formed, in whole or in part, from a high-stiffness (second) material, distinct from the crankshaft material, with a respective modulus of elasticity that is greater than the modulus of elasticity of the crankshaft body material.

Other aspects of this disclosure are directed to manufacturing processes, control logic, and computer-readable media (CRM) for making or using any of the disclosed crankshaft assemblies, internal combustion engines, and/or motor vehicles. In an example, a method is presented for manufacturing a crankshaft assembly. This representative method includes, in any order and in any combination with any of the above and below disclosed options and features: forming a crankshaft body with a first material, the crankshaft body including: a plurality of bearing journals mutually coaxial to rotate on a crankshaft axis and spaced from each other along a length of the crankshaft body, each of the bearing journals defining therein a journal cavity; a plurality of crankpins spaced from each other along the length of the crankshaft body and axially offset from the crankshaft axis, each of the crankpins defining therein a crankpin cavity; and a plurality of crank webs projecting radially from the crankshaft axis and interconnecting the bearing journals and the crankpins, each of the crank webs defining therein a web cavity; and locating a stiffening bar in one or more of the journal cavities, the crankpin cavities, and/or the web cavities, the stiffening bar formed with a second material having a second modulus of elasticity greater than a first modulus of elasticity of the first material.

For any of the disclosed crankshaft assemblies, vehicles, and methods, the internal stiffening bar may include, or may consist essentially of, an I-beam stiffener with an I-shaped transverse cross-section typified by a vertical stem connecting a horizontal lower leg to a horizontal upper arm. In this instance, the opposing transverse ends of the leg and the arm may have rounded edges. The I-beam stiffener may also include inertia-increasing rails that extend along the length of the beam, projecting transversely from top and bottom sides of the beam. When viewed in cross-section, these rails appear as a first rounded protrusion projecting radially from a center of the outer-diameter (OD) surface of the leg and a second rounded protrusion projecting radially from a center of the OD surface of the arm. As yet a further option, the arm and leg may share a vertical (first) thickness whereas the stem has a horizontal (second) thickness that is less than the leg/arm thickness.

For any of the disclosed crankshaft assemblies, vehicles, and methods, a noise-and-vibration attenuating filler material may be packed into the journal cavities, crankpin cavities, and/or web cavities. This filler material is interposed between the internal stiffening bar and the ID surfaces of the bearing journals, crankpins, and/or crank webs housing the stiffening bar(s). As yet a further option, the interface surfaces at which the stiffening bar contacts the ID surfaces of the journal, crankpin, and/or web cavities may be coated, machined, or surface treated to include a surface texture that is designed to increase mechanical adhesion between the stiffening bar and the crankshaft body. It may be desirable that the crankshaft body, including the bearing journals, crankpins, and crank webs, be integrally formed as a single-piece, unitary structure. Optionally, the crankshaft (first) material may include aluminum, aluminum alloys, steel, or nodular iron; comparatively, the stiffening bar (second) material may include steel, alloy steels, or ceramic. For a ceramic-based internal stiffener, a predefined number of discrete ceramic rods (e.g., 4-20) with round or polygonal cross sections may be bundled together and packaged inside the crankshaft body.

For any of the disclosed crankshaft assemblies, vehicles, and methods, the stiffening bar may include an I-beam stiffener having an elongated, non-linear and single-piece body that extends from end-to-end of the crankshaft body, threaded through the journal cavities, the crankpin cavities, and the web cavities. Since the crankpins are axially offset from the bearing journals and, in some applications, circumferentially offset from each other, the I-beam body is twisted—bent transversely and rotated circumferentially—to enable threading of the I-beam stiffener through the journal, crankpin and web cavities. Alternatively, the stiffening bar may include multiple discrete stiffening bars, each of which is mounted within a respective one of the journal, crankpin, and/or web cavities. Each discrete stiffening bar is locked inside the hollow core of a respective journal/crankpin/web cavity and projects out from opposing opens ends of the hollow core.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Figure 1:
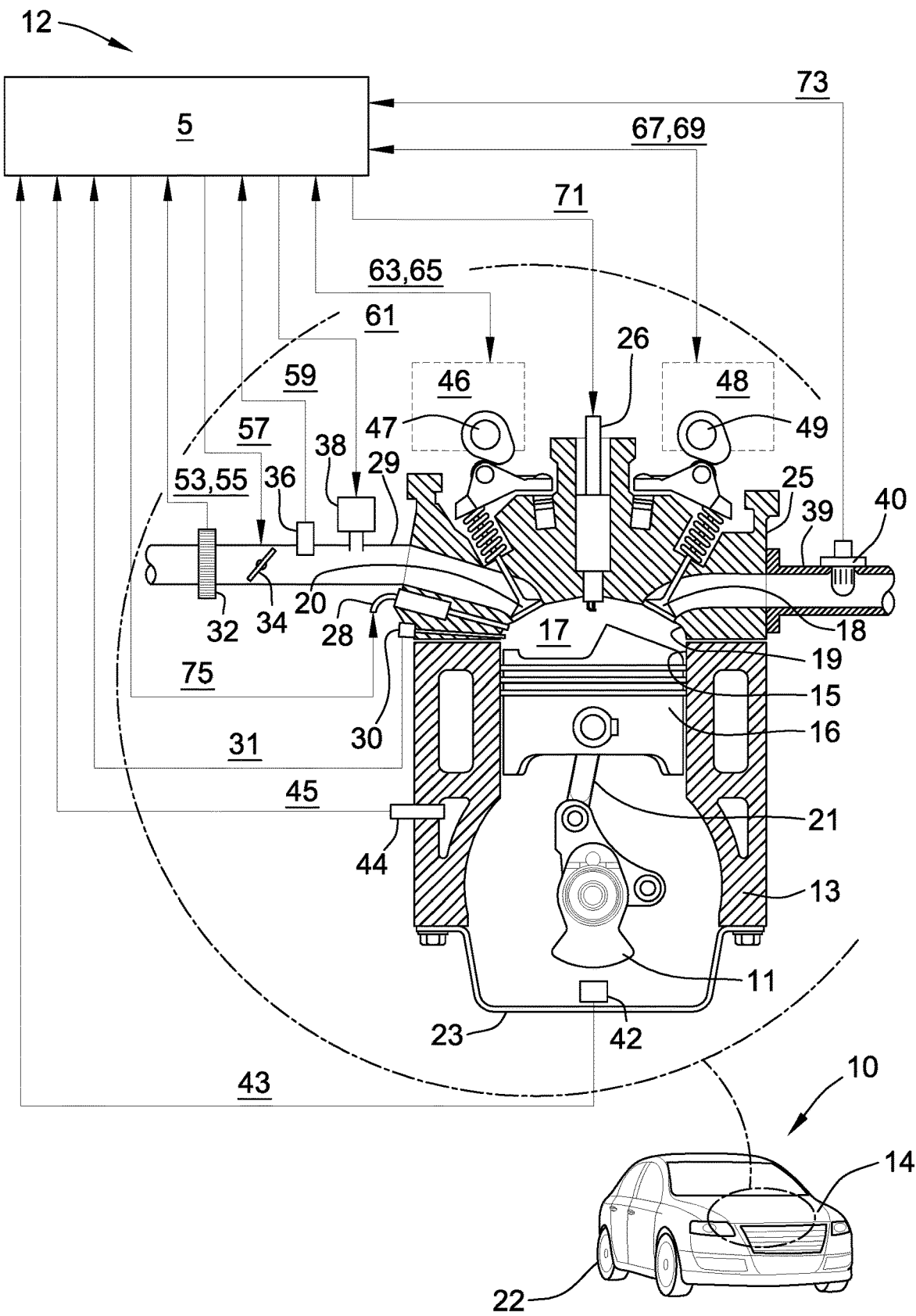
FIG. 1 is a front, perspective-view illustration of a representative motor vehicle with an inset schematic illustration of a representative reciprocating-piston type internal combustion engine assembly with an engine crankshaft having an internal stiffening structure in accord with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as an engine-propelled, sedan-style passenger vehicle. The illustrated automobile 10—also referred to herein as "motor vehicle" or "vehicle" for short—is merely an exemplary application with which novel aspects of this disclosure may be practiced. In the same vein, implementation of the present concepts into a gasoline engine should also be appreciated as an exemplary application of the novel concepts disclosed herein. As such, it will be understood that features of the present disclosure may be applied to other engine configurations, implemented by alternative powertrain architectures, and utilized for any logically relevant vehicular and non-vehicular application. Lastly, only select components of the automobile and internal combustion engine have been shown and will be described in additional detail herein. Nevertheless, the vehicles and engines discussed below may include numerous additional and alternative features, and other available peripheral components for carrying out the various methods and functions of this disclosure.

FIG. 1 illustrates an example of a twin-cam, inline-type engine assembly 12 that is mounted inside an engine bay 14 of the vehicle body. The illustrated engine assembly 12 is a four-stroke, reciprocating-piston engine configuration that operates to propel the vehicle 10, for example, as a direct injection (DI) gasoline engine, including flexible-fuel vehicle (FFV) and hybrid electric vehicle (HEV) variations thereof. The engine assembly 12 can optionally operate in any of an assortment of selectable combustion modes, including a homogeneous-charge compression-ignition (HCCI) combustion mode and an adjustable-lift spark-ignition (SI) combustion mode. Although not explicitly portrayed in FIG. 1, it is envisioned that the vehicle driveline may take on any available configuration, including front wheel drive (FWD) layouts, rear wheel drive (RWD) layouts, all-wheel drive (AWD) layouts, four-wheel drive (4WD) layouts, etc.

The engine assembly 12 employs a series of reciprocating pistons 16 that are slidably movable within cylinder bores 15 of an engine block 13. Engine pistons 16 are typically provided in even numbers of 4, 6, 8, etc., and arranged in a V-type or I-type configuration. The top surface of each piston 16 cooperates with the inner periphery of its corresponding cylinder 15 and a respective chamber surface 19 of a cylinder head 25 to define a variable-volume combustion chamber 17. Each piston 16 is connected by a respective connecting rod 21 and optional linkages to a crankpin (FIG. 2) of a rotating crankshaft 11. The crankshaft 11, in turn, transforms the linear reciprocating motion of the pistons 16 to rotational motion that is output, for example, as a number of rotations per minute (RPM) to a power transmission (not shown) to drive one or more road wheels 22. The crankshaft 11 is shown packaged within a crankcase 23 mounted underneath the engine block 13. While shown as discrete parts, the engine block 13 and cylinder head 25 may be integrally formed as single-piece, unitary "monobloc" construction.

An air intake system transmits intake air to the cylinders 15 through an intake manifold 29, which directs and distributes air into the combustion chambers 17 via intake runners of the cylinder head 25. The engine's air intake system has airflow ductwork and various electronic devices for monitoring and regulating incoming air flow. The air intake devices can include, as a non-limiting example, a mass airflow sensor 32 for monitoring mass airflow (MAF) 53 and intake air temperature (IAT) 55. A throttle valve 34 controls airflow to the engine assembly 12 in response to a control signal (ETC) 57 from a programmable engine control unit (ECU) 5. A pressure sensor 36 in the intake manifold 29 monitors, for instance, manifold absolute pressure (MAP) 59 and barometric pressure.

An optional external flow passage (not shown) recirculates exhaust gases from engine exhaust to the intake manifold 29, employing an exhaust gas recirculation (EGR) valve 38 to meter the volume of recirculated exhaust introduced back into the cylinders 15. The programmable engine control unit 5 controls mass flow of exhaust gas to the intake manifold 29 by controlling opening/closing of the EGR valve 38 via EGR command 61. In FIG. 1, the arrows connecting ECU 5 with the various components of the engine assembly 12 are emblematic of electronic signals or other communication exchanges by which data and/or control commands are transmitted from one component to the other.

Airflow from the intake manifold 29 into the combustion chamber 17 is controlled by one or more intake engine valves 20. Evacuation of exhaust gases out of the combustion chamber 17 to an exhaust manifold 39 is controlled by one or more exhaust engine valves 18. These engine valves 18, 20 are illustrated herein as spring-biased poppet valves; however, other commercially available types of engine valves may be employed. The representative engine assembly's 12 valve train system is equipped to control and adjust the opening and closing of the exhaust and intake engine valves 18, 20. While shown with a single pair of engine valves, it should be appreciated that each cylinder 15 may be equipped with multiple pairs of intake/exhaust engine valves.

Activation of the engine valves 18, 20 may be modulated by controlling exhaust and intake variable cam phasing/ variable lift control (VCP/VLC) devices 46 and 48. These VCP/VLC devices 46, 48 are operable to control an intake camshaft 47 and an exhaust camshaft 49. Rotation of the intake and exhaust camshafts 47, 49 are linked and indexed to rotation of the crankshaft, thus linking openings and closings of the intake and exhaust valves 20, 18 to positions of the crankshaft 11 and the pistons 16. The intake VCP/ VLC device 46 may variably switch and control valve lift of the intake valve(s) 20 in response to a control signal (iVLC) 63, and variably adjust and control phasing of the intake camshaft 47 for each cylinder 15 in response to a control signal (iVCP) 65. Exhaust VCP/VLC device 48 may variably switch and control valve lift of the exhaust valve(s) 18 in response to a control signal (eVLC) 67, and variably adjust and control phasing of the exhaust camshaft 49 for each cylinder 15 in response to a control signal (eVCP) 69.

With continuing reference to the representative configuration of FIG. 1, engine assembly 12 employs a DI fuel injection subsystem with multiple high-pressure electronic fuel injectors 28 that inject pulses of fuel directly into the combustion chambers 17. As shown, each cylinder 15 is provided with one or more fuel injectors 28 that activate in response to an injector pulse width command (INJ_PW) 75 from the ECU 5. These fuel injectors 28 are supplied with pressurized fuel by a fuel distribution system. The fuel injectors 28 may be operable, when activated, to inject multiple fuel pulses per working combustion cycle into a corresponding one of the engine cylinders 15. Engine assembly 12 employs a compression-ignition procedure (for diesel engine architectures) or a spark-ignition procedure (for gasoline engine architectures) by which fuel-combustion-initiating energy, such as an abrupt electrical discharge provided via a spark plug 26 in response to a spark command (IGN) 71, ignites cylinder charges in the combustion chambers 17. Fuel injectors 28 may also take on the form of an electronically controlled, common-rail fuel injector architecture that operates with a normally-off solenoid-driven mode of operation.

The engine assembly 12 is equipped with a variety of sensing devices for monitoring engine operation, including a crank sensor 42 that monitors crankshaft rotational position and outputs a crank angle/speed (RPM) signal 43. A temperature sensor 44 monitors, for example, one or more engine-related temperatures (e.g., coolant temp, oil, etc.) and outputs a signal 45 indicative thereof. An in-cylinder combustion sensor 30 monitors combustion-related variables, such as in-cylinder combustion pressure, charge temperature, fuel mass, air-to-fuel ratio, etc., and outputs a signal 31 indicative thereof. An exhaust gas sensor 40 monitors one or more exhaust gas-related variables, e.g., actual air/fuel ratio (AFR), burned gas fraction, etc., and outputs a signal 73 indicative thereof.

During operation of an engine assembly, the crankshaft may be subject to enormous stresses, including torsional stresses developed from high-speed axial rotation, bending and axial stresses developed from load changes caused by the cranking forces of the cylinders and connecting rods, as well as shear forces caused by compressive forces developed by the combustion cycle. While it is often desirable to reduce the weight and material costs of the crankshaft to achieve concomitant savings in engine/vehicle weight and cost, any such reductions must be balanced with the crankshaft's ability to withstand the stresses accompanying engine operation. Discussed below are crankshaft assembly configurations that offer reduced weight and materials costs with improved noise and vibration attenuation along with increased stress performance.

Figure 2:
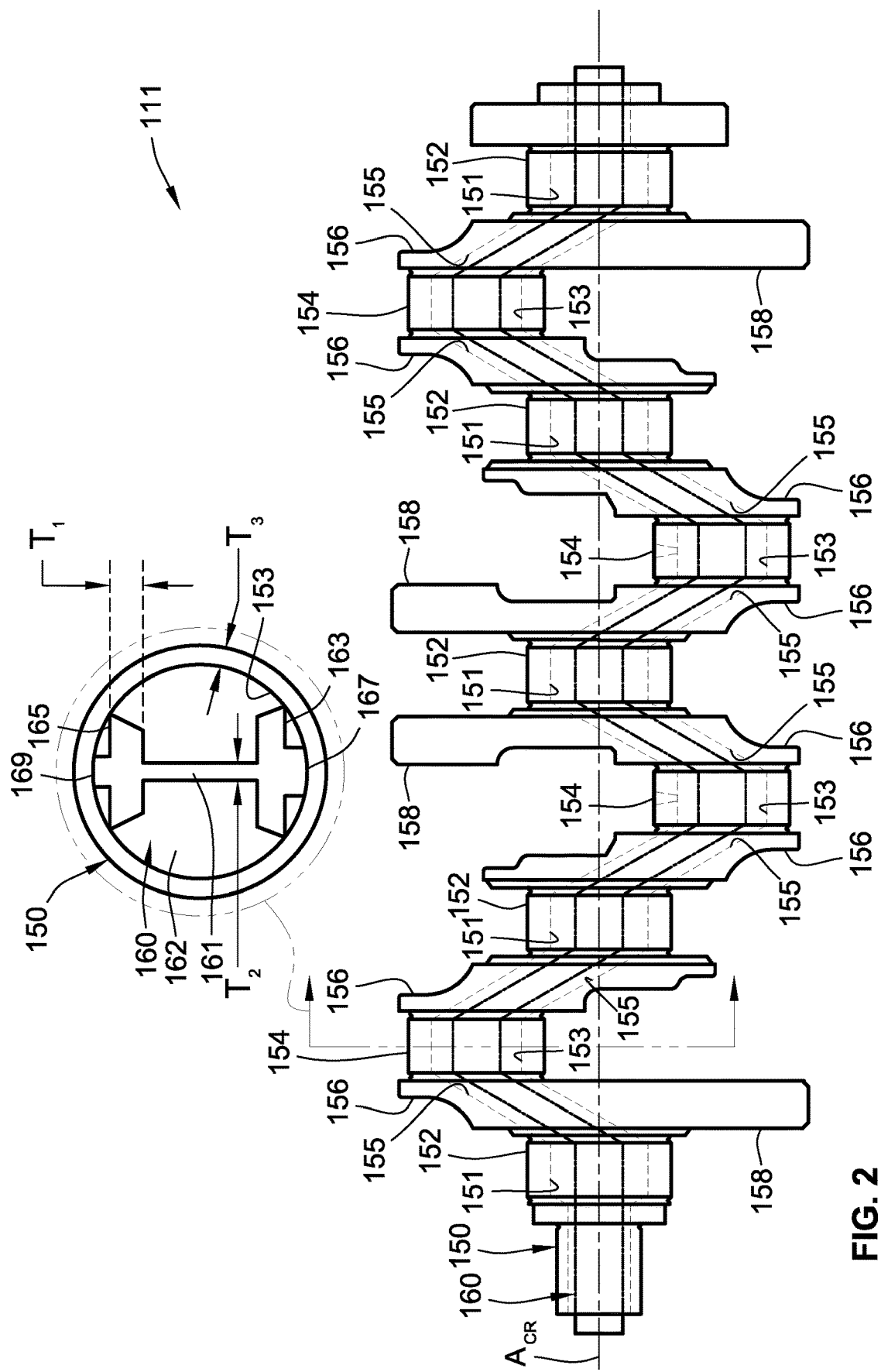
FIG. 2 is a side-view illustration of a representative engine crankshaft assembly with an I-beam core stiffener in accordance with aspects of the present disclosure.
Figure 3:
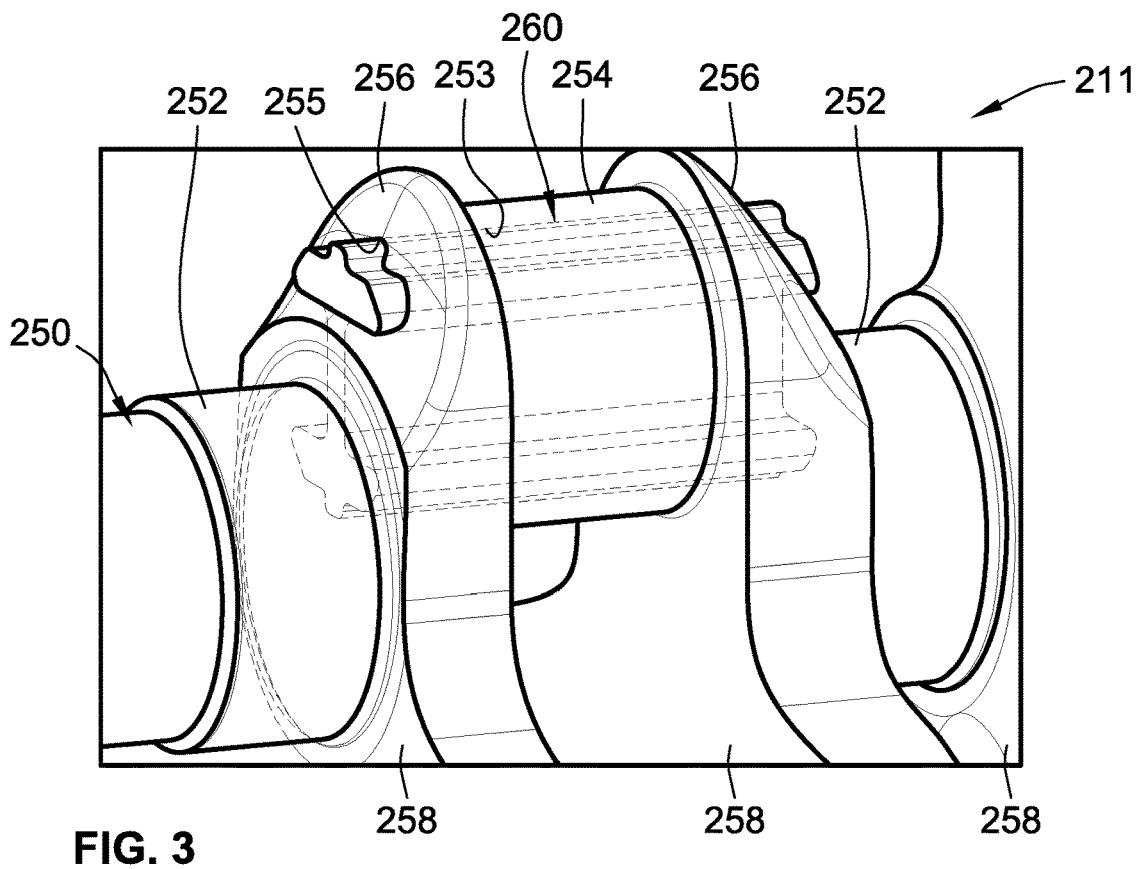
FIG. 3 is perspective-view illustration of a portion of another representative engine crankshaft assembly with discretely packaged I-beam core stiffeners in accord with aspects of the disclosed concepts.
Figure 4:
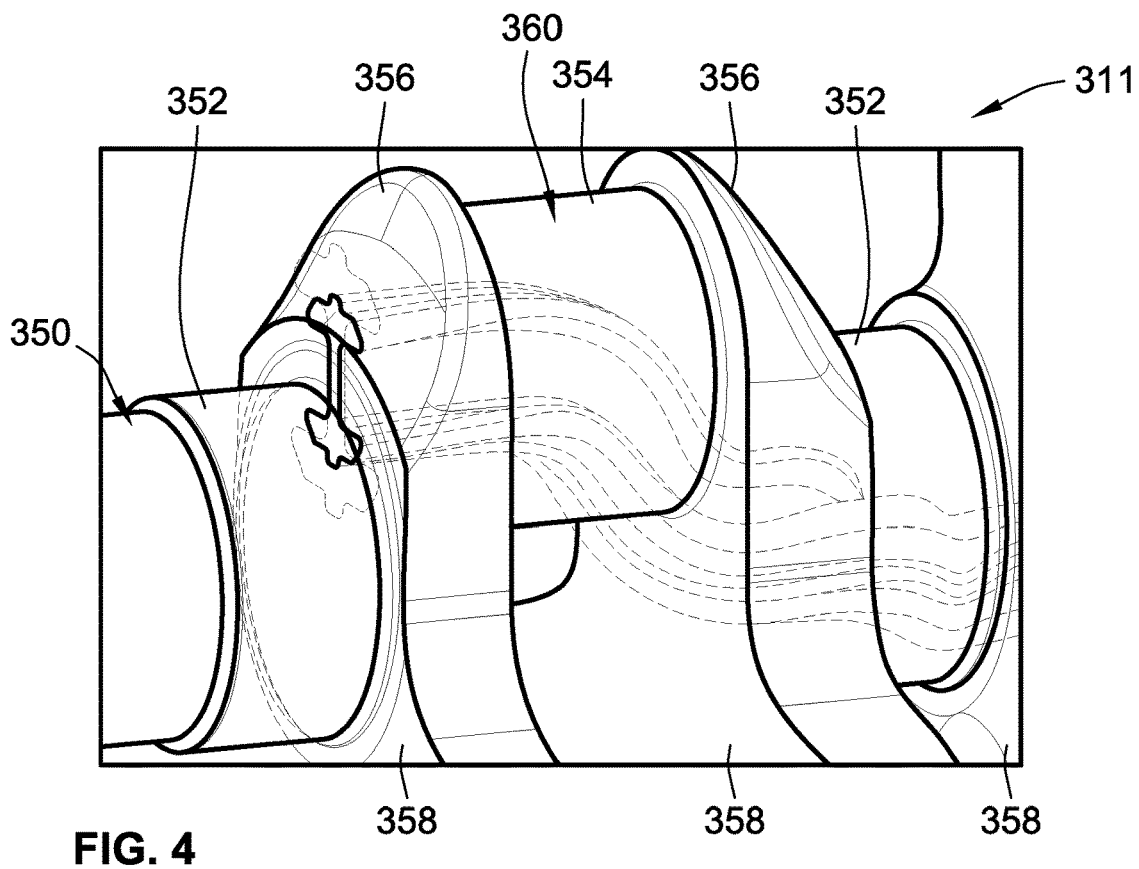
FIG. 4 is perspective-view illustration of a portion of yet another representative engine crankshaft assembly with an internally packaged twisted I-beam core stiffener in accord with aspects of the disclosed concepts.

FIGS. 2-4 present representative crankshaft assemblies with internal stiffening structures that increase the assembly's modulus of elasticity and help to attenuate engine-borne noise and vibrations passed through the assembly. The stiffening structure implements a high-modulus material, such as steel, that may be cast or forged and thereafter placed inside a lower-modulus material, such as nodular iron, of the crankshaft body. A steel stiffening structure may be extruded or rolled from bar stock or may be cast, forged or stamped.

Alternatively, the high-modulus material may be ceramic or other brittle materials that are difficult to machine; in such instances, a softer, ductile material of the crankshaft body, such as nodular iron, may be formed around the high-modulus stiffener material. Contacting surfaces between the crankshaft body and internal stiffener may undergo sanding, shot blasting, peening, chemical etching, etc., to provide a "spiny-lock" surface that helps to improve mechanical adhesion between the two structures.

The geometry of the stiffening core may be optimized to minimize changes to the gating in the metal casting mold; in this example, the steel structure may act like a casting chill that promotes undesirable solidification in one or more segments of the metal casting mold. The internal stiffening structure may take on a tubular geometry, e.g., for avoidance of drilling unnecessary additional oil holes. Breakouts may be allowed at predefined "optimum" locations with, for example, a round breakout instead of an oval breakout (e.g., one short hole is drilled per crankpin and main journal). Compared to an all-steel crankshaft, which is relatively expensive and heavy, a composite crankshaft assembly that is formed from less expensive and lighter nodular iron and reinforced with a steel or ceramic internal stiffener provides comparable stiffness and stress capabilities without the attendant weight and cost. The internal stiffening structure may be strategically located within the crankshaft body and may employ an optimized design geometry for the most effective stiffening characteristics with the lowest manufacturing costs.

Turning next to FIG. 2, there is shown a representative crankshaft assembly 111 with an internal stiffening structure 160 for improved stress, noise, and vibration performance. The crankshaft assembly 111 may be implemented for vehicular applications, such as the crankshaft 11 in engine assembly 12 of FIG. 1, as well as non-vehicular applications, such as reciprocating compressors, oilwell pumps, etc. Although differing in appearance, it is envisioned that any of the features and options described below with reference to the crankshaft assembly 111 of FIG. 2 can be incorporated, singly or in any combination, into the crankshaft assembles 211 and 311 of FIGS. 3 and 4, and vice versa. The crankshaft assembly 111, for example, includes an elongated, non-linear crankshaft body 150 that extends along a central crankshaft axis $A_{CR}$ on which the crankshaft assembly 111 rotates. The crankshaft body 150 is generally defined by a series of main bearing journals 152, a series of crankpins (or "rod bearing journals") 154 interleaved with the bearing journals 152, a series of crank webs (or "arms") 156 interconnecting the bearing journals 152 with the crankpins 154, and an optional set of counterweights 158 coupled to or integral with select crank webs 156. As shown, the crankshaft body 111, including the bearing journals 152, crankpins 154, and crank webs 156, is integrally formed as a single-piece, unitary structure.

Main bearing journals 152 are coaxially aligned with one another, each concentric with the crankshaft axis $A_{CR}$. During rotation on the crankshaft axis $A_{CR}$, the main bearing journals 152 may ride on complementary bearing bushings (not shown) that are held in an engine crankcase of an internal combustion engine assembly (e.g., crankcase 23 of FIG. 1). FIG. 2 illustrates five main bearing journals 152 that are cylindrical structures, which share a common width and diameter and are spaced from one another along the longitudinal length of the crankshaft body 150. Each bearing journal 152 may have a hollow construction with an internal journal cavity 151 that extends axially through the center of the bearing journal 152. In particular, each optional journal cavity 151 may extend completely through a respective main bearing journal 152 with axially spaced cavity openings on an engine-side (first) axial face and a transmission-side (second) face of the journal 152. Optional configurations may comprise greater or fewer than five main bearing journals, main bearing journals with similar or distinct structures to what is shown, and main bearing journals with or without internal cavities or with cavities that are countersunk.

With continuing reference to FIG. 2, the crankshaft assembly 111 may be particularly adapted for an inline four-cylinder (14) engine and, thus, includes four crankpins 154, eight connecting arms 156, and four counterweights 158. Each of the crankpins 154 supports thereon a rod bearing (e.g., plain bearing shells) and functions as an attachment point to which a piston connecting rod (e.g., connecting rod 21 of FIG. 1) attaches a piston (e.g., engine pistons 16) to the crankshaft assembly 111. Similar to the main journal bearings 152, the crankpins 154 are spaced from each other along the longitudinal length of the crankshaft body 150. In contrast to the journal bearings 152, the crankpins 154 are not concentric with the crankshaft axis $A_{CR}$; rather, a centerline of each crankpin 154 is radially spaced (i.e., "axially offset") from the crankshaft axis $A_{CR}$ such that the crankpins 154 orbit around the crankshaft axis $A_{CR}$ during rotation of the assembly 111. As used herein, the term "cavity" may be used to refer to any type of structural void, including through-holes, countersunk holes, cylindrical hollow cores, recessed cavities, geometrically complementary holes, centerline and axially offset cores, etc.

Each crankpin 154 may be structurally identical, sharing a common cylindrical construction with a hollow core defined by an internal crankpin cavity 153 that extends axially through the center of the crankpin 154. Specifically, each optional crankpin cavity 153 may extend completely through a respective crankpin 154 with one cavity opening on an engine-side (first) axial face and another cavity opening on a transmission-side (second) axial face of the crankpin 154. The crankshaft body 150 may comprise greater or fewer than four rod bearing journals, may comprise rod bearing journals with similar or distinct structures to what is shown, and may comprise rod bearing journals with or without internal cavities. To that end, the crankshaft assembly 111 may be configured for other engine styles and architectures, including alternative single-cylinder-bank inline layouts, multi-cylinder-bank (V) style layouts, V and I engines having six, eight, ten, etc. cylinders, or inline and rotary style engines having three, five, seven, etc., cylinders.

Physically coupling the main bearing journals 152 with the crankpins 154 is a succession of crank webs 156 that is interleaved with and sandwiched between the journals 152 and crankpins 154. Each crank web 156 is an oblong structure that projects radially outward from the crankshaft axis $A_{CR}$ and extends from a bearing journal 152 to a crankpin 154. These crank webs 156 may be structurally identical to one another or, alternatively, one subset of the crank webs 156 may share one matching construction whereas another subset of the crank webs 156 may share a different matching construction. As yet a further option, all eight crank webs 156 and their corresponding crankpins 154 may be aligned along a single plane; otherwise, the crankpins 154 and crank webs 156 may be disposed in multiple planes and, thus, are circumferentially spaced around the crankshaft axis $A_{CR}$. When the crankshaft body 150 of FIG. 2 is formed, the crank webs 156 cover the facing open ends of the journal cavities 151 and all of the open ends of the web cavities 155.

Connecting the internal journal cavities 151 of the main bearing journals 152 and the internal crankpin cavities 153 of the crankpins 154 are internal web cavities 155 that extend through the crank webs 156. Similar to the journal and crankpin cavities 151, 153, each optional web cavity 155 may extend completely through a respective crank web 156 with axially opposing cavity openings located on engine-side (first) and transmission-side (second) faces of the crank web 156. In contradistinction with the crankpin and web cavities 153, 155, which are shown with constant diameters and centerline "origin" axes that are parallel to the crankshaft axis $A_{CR}$, the internal web cavities 155 are obliquely angled with respect to the crankshaft axis $A_{CR}$ and have varying transverse cross-sections that change along the length of the crankshaft body 150.

To help mitigate the torsional and shear forces acting on the main bearing journals 152 and thereby improve the operational life expectancy of the crankshaft supporting bearings, a set of counterweights 158 may be attached to the crankshaft body 150 and extend radially away from the crankshaft axis $A_{CR}$. As shown, each counterweight is a semi-circular structure that is integrally formed with a respective crank web 156, projecting from the crankshaft body 150 on a side thereof opposite the web 156 and its mated crankpin 154. These counterweights 158 help to offset the reciprocating masses of the pistons, piston rings, piston pins, retaining clips, and the upper part of the connecting rod as well as the rotating mass of the lower part of the connecting rod, bearings and crankshaft assembly 111. Since the crank webs 156 are structural members of the crankshaft body 150 physically connecting the main and rod bearing journals, whereas the counterweights 158 may be designed to reduce bearing loads and balance engine vibrations, the crankshaft body 150 may have any number of counterweight structures attached to the various segments in any combination.

Structurally reinforcing the crankshaft assembly 111 of FIG. 2 is an internal stiffening structure 160 (also referred to herein as "stiffening bar") in the form of a rigid and contoured beam that is threaded through one or more or all of the journal, crankpin, and web cavities 151, 153, 155 and permanently attached to the crankshaft body 150. As noted above, the crankshaft body 150 is fabricated with a rigid material having a relatively low cost, weight, and modulus of elasticity, whereas the stiffening structure 160 is fabricated with a different rigid material having a relatively high modulus of elasticity that is greater than the elastic modulus of the crankshaft body 150. For instance, the crankshaft body 150 may be formed, in whole or in part, from aluminum, aluminum alloy, titanium, or nodular iron; conversely, the stiffening structure 160 may be formed, in whole or in part, from steel, alloy steel, or ceramic, such as silicon nitride, silicon carbide or zirconia. In a more specific example, the crankshaft body 150 of FIG. 2 is forged or cast from nodular "ductile" iron with an elastic modulus (E) of at least 120 gigapascals (GPa) or, in some applications, about 130 to about 170 GPa. The stiffening structure 160, on the other hand, is hot-formed, extruded, cast from carbon steel with an elastic modulus of at least 180 GPa or, in some applications, about 200-240 GPa. The stiffening structure 160 may also be formed from a ceramic material with an elastic modulus of about 300-400 GPa. As will be described below in the discussion of FIGS. 3 and 4, the stiffening structure 160 may take on different combinations of shapes, sizes, locations, and materials within the intended scope of this disclosure.

The packaging and design of the internal stiffening structure 160 may be engineered to simplify manufacture of the crankshaft assembly 111 while optimizing the elastic deformation characteristics of the assembly 111. According to the illustrated example, the stiffening structure 160 is a non-linear, single-piece construction that is located almost entirely within the crankshaft body 150 with only negligible segments at opposing ends thereof projecting from longitudinal ends of the crankshaft body 150. As best seen in the cross-sectional illustration presented in the inset view of FIG. 2, the representative stiffening structure 160 takes on the form of an elongated I-beam stiffener that extends diametrically across the internal cavities 151, 153, 155 within the bearing journals 152, crankpins 154, and crank webs 156 and contacts the ID surface of the crankshaft body 150. With this construction, the stiffening structure 160 is immovably and securely mounted inside the crankshaft body 150. As noted above, the cavities 151, 153, 155 may be cylindrically shaped through-holes or may be geometrically complementary through-holes that are substantially identical to the geometry of the stiffening structure 160.

Stiffening structure 160 of FIG. 2 has an I-shaped transverse cross-section characterized by a vertical stem 161 interconnected with a horizontal lower leg 163 and a horizontal upper arm 165. Opposing transverse ends of the leg 163 and arm 165 may be squared, e.g., for simplification of design and manufacture, pointed (FIG. 2), e.g., in order to localize shaft-to-stiffener contact, or may have rounded edges (FIG. 3), e.g., to provide flush contact between the stiffening structure 160 and the crankshaft body 150 when formed with hollow cores. Projecting vertically downwards and upwards from bottom and top sides, respectively, of the I-beam stiffener 160 is an optional pair of inertia-increasing rails 167 and 169 that may extend along the entire longitudinal length of the I-beam stiffener 160. When viewed in cross-section, these rails 167, 169 appear as bread loaf-shaped protrusions (FIG. 2) or semicircular protrusions (FIGS. 3 and 4), each of which has a rounded contact face and projects radially from a center of an OD surface of either the leg 163 or the arm 165. It is envisioned that the stiffening structure 160 may take on alternative geometries, sizes and orientations from that which are shown in the drawings.

To aid in castability while maximizing stiffness and reducing mass, the arm 163 and the leg 165 may share a vertical (first) thickness $T_1$, whereas the stem 161 may have a horizontal (second) thickness $T_2$ that is less than the first thickness $T_1$. In at least some embodiments, the vertical thickness $T_1$ of the leg and arm 163, 165 is about 10 mm to about 15 mm, whereas the horizontal thickness $T_2$ of the stem 161 is about 5 mm to about 8 mm. In this example, a wall thickness $T_3$ of the crankshaft body 150 may be about 3 mm to about 6 mm such that the crankshaft body 150 has an OD surface diameter of about 46 mm to about 52 mm. Alternatively, the leg/arm and stem thicknesses $T_1$ and $T_2$ may be substantially the same.

An optional filler material 162, such as polymeric foam, tin, aluminum, nylon or a suitable material with a high melting point may be disposed within the journal, crankpin, and/or web cavities 151, 153, 155 and interposed between the stiffening bar 160 and the ID surfaces of the bearing journals 152, crankpins 154, and/or crank webs 156. Addition of such filler material 162 helps to further attenuate vibrational, bending, and torsional forces borne by the crankshaft assembly 111. Conversely, the cavity space between the stiffening bar 160 and the ID surfaces of the crankshaft body 150 may be left empty, e.g., to function as fluid conduits for the dissemination of lubricant. Optional steel slugs (not shown) may be cast in or otherwise mounted to the counterweights 158 to offset the inertial of the internal stiffening structure 160. Furthermore, the interface surfaces at which the internal stiffening structure 160 contacts the ID surfaces of the journal, crankpin, and web cavities 151, 153, 155 may be texturized to increase the mechanical adhesion between the stiffening bar 160 and crankshaft body 150.

Turning next to FIG. 3, there is shown another representative engine crankshaft assembly 211 generally composed of a crankshaft body 250 with multiple discretely packaged stiffening structures 260 (also referred to herein as "I-beam core stiffeners") packaged within select segments of the crankshaft body 250. As mentioned above, the crankshaft assembly 211 may take on any of the features and options described above with respect to crankshaft 11 of FIG. 1 or crankshaft 111 of FIG. 2. The crankshaft body 250, for example, includes multiple main bearing journals 252, multiple crankpins 254 interleaved with the bearing journals 252, multiple crank webs 256 physically connecting the bearing journals 252 to the crankpins 254, and optional counterweights 258 connected to one or more of the crank webs 256.

Rather than employing a single-piece internal stiffening structure that extends through multiple regions of the crankshaft, such as those shown in FIGS. 2 and 4, the crankshaft assembly 211 of FIG. 3 employs a set of discretely packaged I-beam stiffening bars 260, each of which is mounted within a respective location of the crankshaft body 250. As shown, the I-beam stiffening bars 260 are rigidly mounted inside discrete crankpin cavities 253 within the crankpins 254 and extend through neighboring web cavities 255 of the crank webs 256 adjoining the respective crankpins 254. In this example, the web cavities 255 are through-holes with a pair of axially spaced openings, one of which adjoins the crankpin cavity 253 and the other of which is unobstructed and open to the exterior of the crankshaft body 250. With this configuration, the discretely packaged stiffening bars 260 project out from the unstructured opens ends of the web cavities 255 in the crank webs 256 adjoining the crankpin 254 within which that stiffening bar 260 is permanently attached. The exposed ends of the I-beam stiffening bars 260 maybe trimmed or machined off during standard crankshaft machining e.g., to save assembly and manufacturing costs. The stiffening bars 260 of FIG. 3 are shown extending diametrically across and coextensive with the cavities 253, 255.

FIG. 4 depicts another representative engine crankshaft assembly 311 that includes a crankshaft body 350 with an internally packaged stiffening structure 360 (also referred to herein as "twisted I-beam stiffener") that extends longitudinally through some, but not all, regions of the crankshaft body 350. Similar to the crankshaft assemblies 111 and 211 of FIGS. 2 and 3, respectively, the crankshaft body 350 of FIG. 4 includes longitudinally spaced main bearing journals 352 that are interconnected with axially offset crankpins 354 via interleaved crank webs 356. An optional set of radially projecting, circumferentially spaced counterweights 358 are shown connected to the crank webs 356.

The twisted I-beam stiffener bar 360 has an elongated, non-linear beam body that extends through select journal cavities, select crankpin cavities, and select web cavities; however, the twisted I-beam stiffener bar 360 is located entirely within the crankshaft body 350 and, thus, does not project from the opposing longitudinal ends of the crankshaft body 350. In order to thread through the internal cavity network of the crankshaft body 350, the body of the twisted I-beam stiffener bar 360 is bent transversely (e.g., vertically upwards and downwards in FIG. 3) and rotated circumferentially (e.g., torqued clockwise in FIG. 4) with respect to a center axis of the I-beam stiffener 360. According to the illustrated example, the twisted I-beam stiffener bar 360 does not extend diametrically across the journal/crankpin/web cavities but, rather, has an I-beam height that is less than the internal diameters of these cavities. The I-beam may have a variable height and width along its length, with a smaller height in the crank arms 356. The I-beam may also be contained in a sand core near its end. The last 10-30 mm of the beam may be encased in sand. This way the steel beam may not have to be machined.

Some optional configurations may combine the features of FIGS. 3 and 4 such that: (1) the internal stiffening structure is a single-piece constructions that is threaded through the cavities of the crankshaft body; (2) the sections of the internal stiffening structure within the main and rod bearing journals extending diametrically across and are coextensive with their internal cavities; and (3) the sections of the internal stiffening structure within the crank webs are twisted and have a reduced height to accommodate the transitionary cavities within the webs. A preferred embodiment may consist of a steel I-beam with each end encased in a sand core, e.g., for the last about 20 mm. Another about 20 mm to about 50 mm of core print may extend out beyond the crankshaft body to secure the internal I-beam during the crankshaft casting process. After the casting cools, the sand is removed (e.g., shaken out) from the core, leaving the I-beam recessed 20 mm inside the casting.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:
1. A crankshaft assembly, comprising:
a crankshaft body formed with a first material and including:
a plurality of bearing journals mutually coaxial to rotate on a crankshaft axis and spaced from each other along a length of the crankshaft body, each of the bearing journals defining therein a journal cavity,
a plurality of crankpins spaced from each other along the length of the crankshaft body and axially offset from the crankshaft axis, each of the crankpins defining therein a crankpin cavity, and
a plurality of crank webs projecting radially from the crankshaft axis and interconnecting the bearing journals and the crankpins, each of the crank webs defining therein a web cavity; and
a stiffening bar disposed in one or more of the journal cavities, the crankpin cavities, and/or the web cavities, the stiffening bar formed with a second material having a second modulus of elasticity greater than a first modulus of elasticity of the first material, the stiffening bar including an I-beam stiffener with an I-shaped transverse cross-section having a leg, an arm, a stem connecting the leg and the arm, a first rounded protrusion projecting radially from an outer-diameter (OD)

surface of the leg, and a second rounded protrusion projecting radially from an OD surface of the arm.

2. The crankshaft assembly of claim 1, wherein the leg and the arm each includes a respective pair of opposing transverse ends with rounded edges.

3. The crankshaft assembly of claim 1, wherein the arm and the leg have a first thickness and the stem has a second thickness less than the first thickness.

4. The crankshaft assembly of claim 1, further comprising a filler material disposed within the journal cavities, the crankpin cavities, and/or the web cavities and interposed between the stiffening bar and the bearing journals, the crankpins, and/or the crank webs.

5. The crankshaft assembly of claim 1, wherein the stiffening bar includes an interface surface at which the stiffening bar contacts inner-diameter (ID) surfaces of the journal cavities, the crankpin cavities, and/or the web cavities, the interface surface having a surface texture configured to increase a mechanical adhesion between the stiffening bar and the crankshaft body.

6. The crankshaft assembly of claim 1, wherein the I-beam stiffener has an elongated non-linear beam body extending through the journal cavities, the crankpin cavities, and the web cavities.

7. The crankshaft assembly of claim 6, wherein the beam body of the I-beam stiffener is bent transversely and rotated circumferentially with respect to a center axis of the I-beam stiffener.

8. The crankshaft assembly of claim 1, wherein the stiffening bar includes a plurality of discrete stiffening bars each mounted within a respective one of the journal cavities, the crankpin cavities, and/or the web cavities.

9. The crankshaft assembly of claim 8, wherein each of the journal cavities, the crankpin cavities, and the web cavities defines therein a through-hole with a hollow core having opposing open ends, and wherein each of the discrete stiffening bars is located in a respective one of the hollow cores and projects out from the open ends of the hollow core.

10. The crankshaft assembly of claim 1, wherein the first material includes aluminum, aluminum alloy, or nodular iron, and wherein the second material includes steel, alloy steel, or ceramic.

11. The crankshaft assembly of claim 1, wherein the crankshaft body,
including the bearing journals, the crankpins, and the crank webs, is integrally formed as a single-piece structure.

12. A motor vehicle comprising:
a vehicle body;
a plurality of road wheels rotatably attached to the vehicle body; and
an internal combustion engine (ICE) assembly attached to the vehicle body and operable to output engine torque to one or more of the road wheels to thereby propel the motor vehicle, the ICE assembly having an engine block defining a plurality of cylinder bores, a plurality of pistons each reciprocally movable within a respective one of the cylinder bores, and a crankshaft assembly including:
a single-piece crankshaft body formed with a first material and including:
a plurality of bearing journals rotatably attached to the engine block, mutually coaxial to rotate on a crankshaft axis, and spaced from each other along a length of the crankshaft body, each of the bearing journals defining therethrough a journal cavity,
a plurality of crankpins each coupled to a respective one of the pistons, spaced from each other along the length of the crankshaft body, and axially offset from the crankshaft axis to orbit about the crankshaft axis, each of the crankpins defining therethrough a crankpin cavity, and
a plurality of crank webs projecting radially from the crankshaft axis and interconnecting the bearing journals and the crankpins, each of the crank webs defining therethrough a web cavity; and
an I-beam stiffener with an elongated non-linear beam body bent transversely and rotated circumferentially with respect to a center axis of the I-beam stiffener, the I-beam stiffener extending through the journal cavities, the crankpin cavities, and the modulus of elasticity greater than a first modulus of elasticity of the first material.

13. A method of manufacturing a crankshaft assembly, the method comprising:
forming a crankshaft body with a first material, the crankshaft body including:
a plurality of bearing journals mutually coaxial to rotate on a crankshaft axis and spaced from each other along a length of the crankshaft body, each of the bearing journals defining therein a journal cavity,
a plurality of crankpins spaced from each other along the length of the crankshaft body and axially offset from the crankshaft axis, each of the crankpins defining therein a crankpin cavity, and
a plurality of crank webs projecting radially from the crankshaft axis and interconnecting the bearing journals and the crankpins, each of the crank webs defining therein a web cavity; and
locating a stiffening bar in the journal cavities, the crankpin cavities, and the web cavities, the stiffening bar formed with a second material having a second modulus of elasticity greater than a first modulus of elasticity of the first material, the stiffening bar including an I-beam stiffener with an elongated non-linear beam body extending through the journal cavities, the crankpin cavities, and the web cavities, wherein the beam body is bent transversely and rotated circumferentially with respect to the crankshaft axis.

14. The method of claim 13, wherein the I-beam stiffener has an I-shaped transverse cross-section having an arm, a leg, and a stem connecting the leg and the arm.

15. The method of claim 14, wherein the leg and the arm each includes a respective pair of opposing transverse ends with rounded edges.

16. The method of claim 14, wherein the I-shaped transverse cross-section further includes a first rounded protrusion projecting radially from an outer-diameter (OD) surface of the leg and a second rounded protrusion projecting radially from an OD surface of the arm.

17. The method of claim 13, further comprising adding a filler material within the journal cavities, the crankpin cavities, and/or the web cavities and interposed between the stiffening bar and the bearing journals, the crankpins, and/or the crank webs.

18. The method of claim 13, wherein the arm and the leg have a first thickness and the stem has a second thickness less than the first thickness.

19. The method of claim 13, wherein the first material includes aluminum, aluminum alloy, or nodular iron, and wherein the second material includes steel, alloy steel, or ceramic.

20. The method of claim 13, wherein the crankshaft body, including the bearing journals, the crankpins, and the crank webs, is integrally formed as a single-piece structure.

\* \* \* \* \*

UNITED STATES PATENT AND TRADEMARK OFFICE
CERTIFICATE OF CORRECTION

| | |
|---|---|
| PATENT NO. | : 11,549,549 B2 |
| APPLICATION NO. | : 17/304120 |
| DATED | : January 10, 2023 |
| INVENTOR(S) | : Dale E. Murrish, Scott A. Hucker and Maurice G. Meyer |

It is certified that error appears in the above-identified patent and that said Letters Patent is hereby corrected as shown below:

In the Claims

Claim 12, Column 15, Line 49-67 thru Column 16, Line 1-18, Should read:
12. A motor vehicle comprising:
a vehicle body;
a plurality of road wheels rotatably attached to the vehicle body; and
an internal combustion engine (ICE) assembly attached to the vehicle body and operable to output engine torque to one or more of the road wheels to thereby propel the motor vehicle, the ICE assembly having an engine block defining a plurality of cylinder bores, a plurality of pistons each reciprocally movable within a respective one of the cylinder bores, and a crankshaft assembly including:
a single-piece crankshaft body formed with a first material and including:
a plurality of bearing journals rotatably attached to the engine block, mutually coaxial to rotate on a crankshaft axis, and spaced from each other along a length of the crankshaft body, each of the bearing journals defining therethrough a journal cavity,
a plurality of crankpins each coupled to a respective one of the pistons, spaced from each other along the length of the crankshaft body, and axially offset from the crankshaft axis to orbit about the crankshaft axis, each of the crankpins defining therethrough a crankpin cavity, and
a plurality of crank webs projecting radially from the crankshaft axis and interconnecting the bearing journals and the crankpins, each of the crank webs defining therethrough a web cavity; and
an I-beam stiffener with an elongated non-linear beam body bent transversely and rotated circumferentially with respect to a center axis of the I-beam stiffener, the I-beam stiffener extending through the journal cavities, the crankpin cavities, and the web cavities, the I-beam stiffener formed with a second material having a second modulus of elasticity greater than a first modulus of elasticity of the first material.

Signed and Sealed this
Third Day of September, 2024

Katherine Kelly Vidal
*Director of the United States Patent and Trademark Office*